Figure 1:
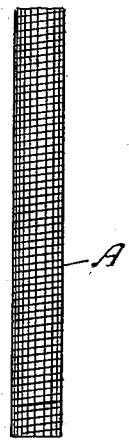

Nov. 25, 1941.   W. LARKIN   2,264,213
FLEXIBLE TUBING
Filed Oct. 4, 1940   3 Sheets-Sheet 1

Inventor
Walter Larkin
by his Attorneys.
Howson & Howson

Nov. 25, 1941.   W. LARKIN   2,264,213
FLEXIBLE TUBING
Filed Oct. 4, 1940   3 Sheets-Sheet 2
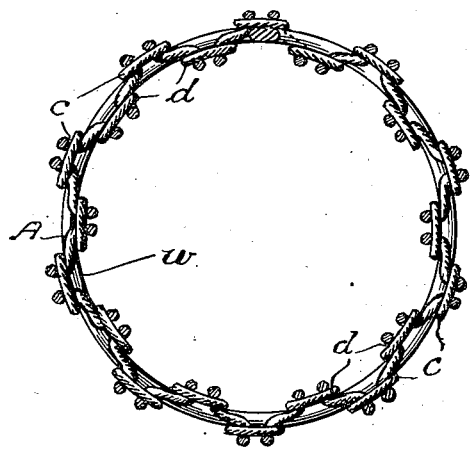
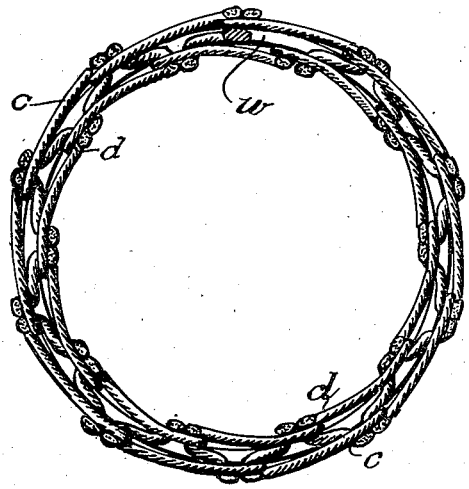
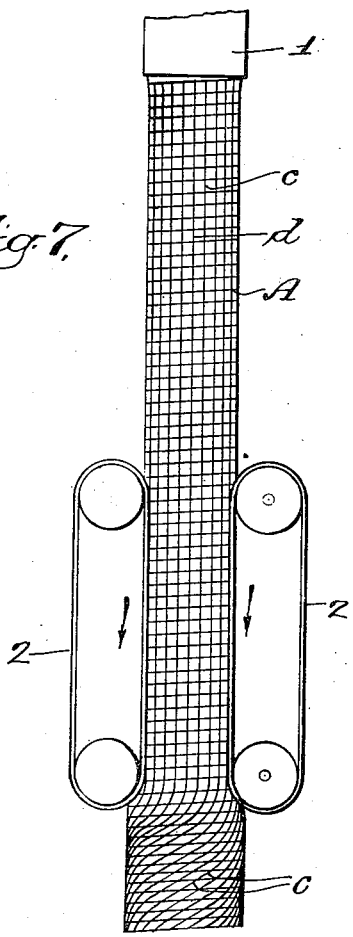
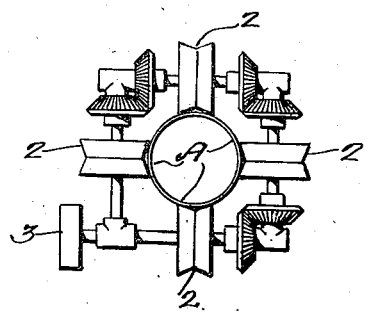
Inventor.
Walter Larkin
by his Attorneys.
Howson & Howson Nov. 25, 1941.    W. LARKIN    2,264,213
FLEXIBLE TUBING
Filed Oct. 4, 1940    3 Sheets-Sheet 3
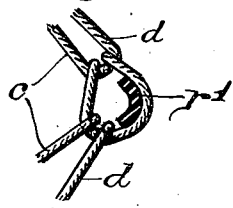
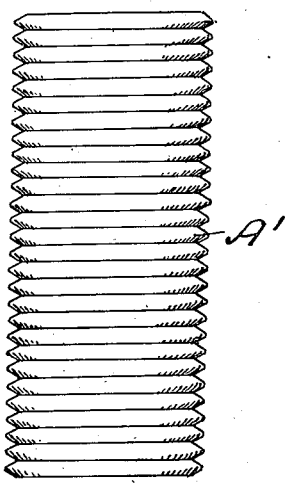
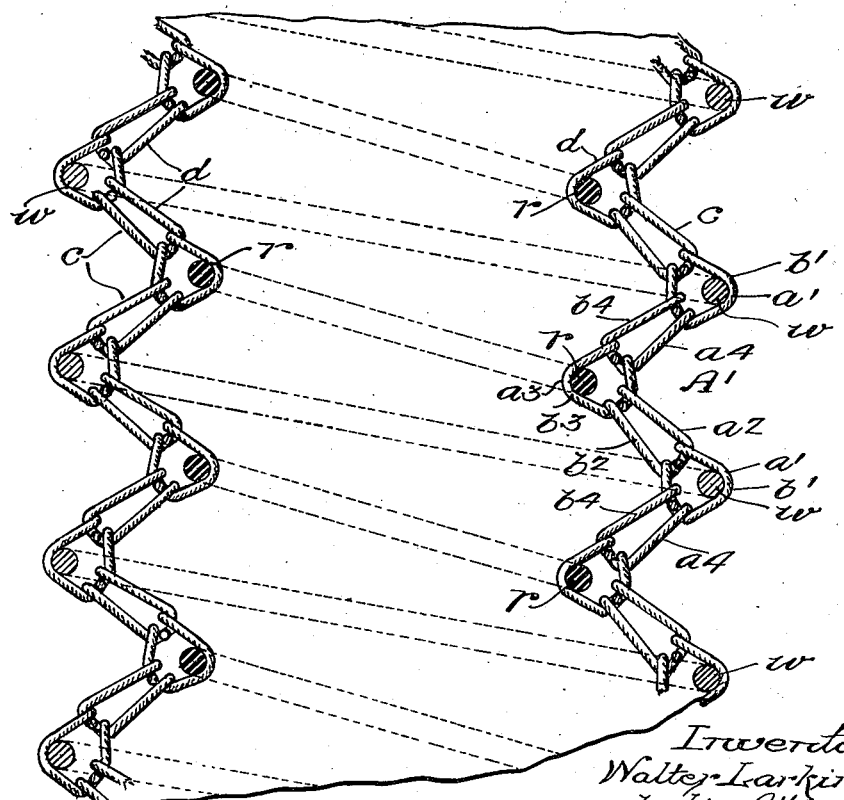

Patented Nov. 25, 1941

2,264,213

UNITED STATES PATENT OFFICE 2,264,213

FLEXIBLE TUBING

Walter Larkin, Norristown, Pa., assignor to Fidelity Machine Company, Wilmington, Del., a corporation of Delaware Application October 4, 1940, Serial No. 359,793

12 Claims. (Cl. 66—190)

This invention relates to flexible tubing for use in connection with automobile heating, defrosting and air conditioning units, vacuum cleaner attachments, dictograph and other speaking tube systems, or any apparatus requiring flexible tubing for the conduction of gaseous fluid or sound.

The primary object of the present invention resides in producing a flexible tube which will not collapse or deform cross-sectionally when subjected to sharp bending longitudinally.

Another object of the invention resides in forming the tube of seamless circular-knit fabric, with a spring wire incorporated directly in the wall of the tube, as an integral part thereof, in active spiral convolutions respectively embodied in predetermined spiral courses of the sitches of which the wall of the tube is composed and which tend to expand the tube radially in opposition to the natural reactionary tendency of a knitted tube to contract when released from the normal tension under which the tube is knitted.

Another object of the invention resides in forming the tube of seamless circular-knit fabric and incorporating convolutions of a spring wire in predetermined courses respectively of the stitches of which the tube is formed, with the convolutions wound in one direction about the axis of the tube and constantly exerting a counter-directional twist to the fabric, to cause the stitch wales to change from a normal relationship parallel to the axis of the tube into an angular relationship extending spirally about the tube axis, whereby the stitches of adjacent wales and successive courses are brought into a compact relationship reducing the normal areas of the interstices of the fabric to a minimum, for impregnation or coating of the fabric with a suitable elastic filler, such as latex, by which the wall of the tube is rendered air and sound-proof without loss of flexibility.

Another object of the invention resides in incorporating a rubber strand in predetermined stitch courses, intermediate those in which the spring wire is incorporated, to contract the tube radially between the expanding convolutions of the wire, to produce circumferentially extending corrugations in the wall of the tube by which longitudinal bending of the tube on arcs of extremely small radii may be readily accomplished.

Figure 4:
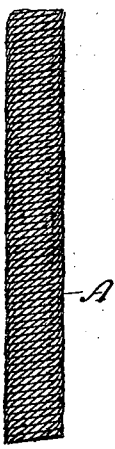
Figure 2:
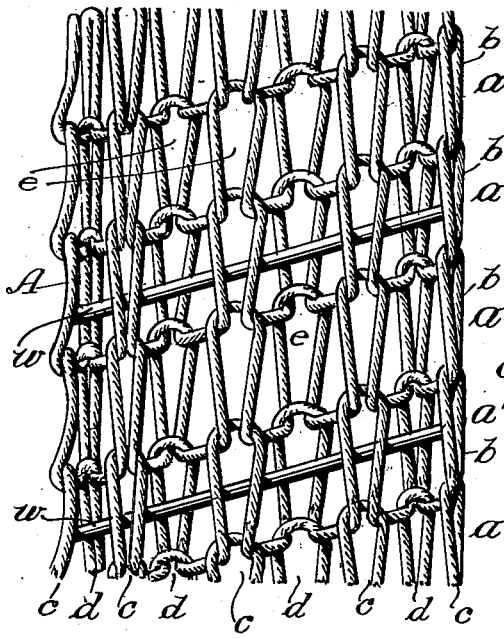
Figure 5:
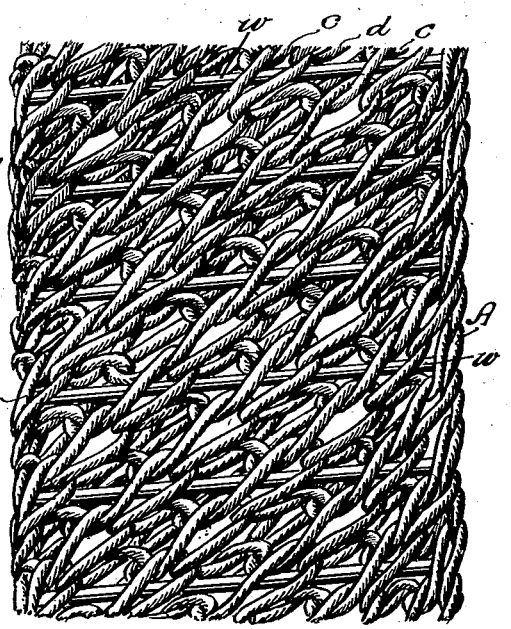

In the accompanying drawings:

Figs. 1, 2 and 3 diagrammatically illustrate a seamless circular-knit tube embodying the expanding wire, according to the principles of the present invention, with the tube in the form attained during knitting;

Figs. 4, 5 and 6 diagrammatically illustrate the tube of Figs. 1, 2 and 3, respectively, in the form the tube assumes after release from the knitting machine;

Figs. 7 and 8 diagrammatically illustrate apparatus associated with the knitting machine for holding the tube in the form of Fig. 2, and for releasing the tube to assume the form of Fig. 5; and Figs. 9 to 11 illustrate a tube embodying an expanding wire and a contracting rubber strand incorporated in alternate succession throughout the length of the tube.

As shown in Fig. 2, the tube A is composed of continuous spiral courses of stitches $a$, $a$ which alternate and are interknit with continuous spiral courses of sitches $a1$, $a1$. Collectively, the stitch courses $a$ and $a1$ form stitch wales $c$ on the outer surface of the tube and alternating stitch wales $d$ which are formed on the inner surface of the tube.

As shown in Fig. 2, a spring wire $w$, which may be composed of any suitable metal, preferably steel, is laid-in in the courses $a1$, $a1$, between the stitches of the outside wales $c$ and the stitches of the inside wales $d$.

The tube A, in the instance of Figs. 1 to 6 inclusive, is knit on a "two feed" machine. A body yarn $b$ is fed to the needles forming both the inside and the outside wales $c$ and $d$ respectively, at one feed, to produce the courses $a$, $a$; and a second body yarn $b1$ is fed to the same needles, at the second feed, to produce the courses $a1$, $a1$.

Intermediate the first and second feeds, the wire $w$ is laid-in in the courses $a1$, $a1$, between the stitches of the inner wales $d$, which are hanging on alternate needles of the machine, and the stitches of the outer wales $c$, which are hanging on the intermediate needles of the machine, before the body yarn $b$ is fed to all the needles to produce the next course of stitches $a$.

The wire $w$ has an inherent tendency to straighten out. When laid-in in the fabric, as above noted, the wire $w$ is flexed into spiral convolutions having an outside diameter substantially equal to or less than the inside diameter or bore of the circular needle bed of the machine The lower portion of the circular needle bed, or an axial extension thereof, is indicated at $l$, in Fig. 7. The tube A, after knitting, passes out of the bore of the needle bed $l$ and is gripped at relatively spaced points around its circumference by a series of belts 2, 2 operating on lines parallel to the axis of the tube. These belts are driven by a common actuator 3 at a surface speed substantially equal to the linear knitting speed of the machine and draw the knitted tube A away from the bore of the needle bed 1 at the rate of production of the tube A.

The belts 2 hold the tube A to the normal knitting diameter of the machine and prevent the tube from twisting circumferentially and expanding radially under the tendency of the wire $w$ to straighten out or unwind from the convolutions. The tube A is thus kept from binding in the bore of the needle bed 1; and the wales $c$ and $d$ are held in position parallel to the axis of the tube A in order that the normal knitting may be effected.

As soon as the tube A passes below the lower ends of the holding belts 2, and is released from the grip of the belts, the wire $w$ tends to straighten out or unwind. In so doing, the wire $w$ constantly exerts a counter-directional twist on the tube A and increases the diameter of the convolutions of the wire and the stitch courses in which the convolutions are respectively incorporated from the normal knitting diameter, shown in Fig. 3, to the released diameter shown in Fig. 6.

The expanding of the diameter of the convolutions of the wire $w$, as noted above, twists the tube A about its axis and causes the wales $c$ and $d$ to assume an angular relation with respect to the axis of the tube A, which results in the wales assuming a spiral form. This twist of the tube continues until the stitches of adjacent wales and of succeeding courses are packed closely together circumferentially and axially of the tube, as clearly shown in Fig. 5. This compacting of the tube reduces the normal size of the interstices $e$ (Fig. 2) of the knitted fabric to a minimum (Fig. 5).

In order to make the tube A air proof, insofar as the wall of the tube is concerned, the tube is preferably impregnated with any suitable flexible substance, which may be applied to either the inner or outer surface, or both, of the tube, either while the tube is in its straight normal knitted condition, as shown in Figs. 1, 2 and 3, or after the tube has been released and permitted to twist circumferentially and expand radially, as indicated in Figs. 4, 5, and 6. In each instance the twisting of the tube reduces the size of the interstices which are to be filled with the impregnating substance in order to make the tube impervious to the passage of air through the walls thereof.

Preferably the impregnating substance employed is a liquid latex, which may be readily sprayed against the inner and/or outer surface of the tube, after knitting thereof and while the knitting progresses, or the outer coating may be applied by submerging the tube in a bath of the impregnating substance after release.

In that form of the invention shown in Figs. 9 and 10, the wire $w$ is laid-in in every fourth course. In this instance the tube A1 is knit on a "four feed" machine. After each course $a1$ is knit, at one feed, by the body yarn $b1$, the wire $w$ is laid-in in the fabric against the stitches of the inside and outside wales hanging on alternate needles, as above noted. A body yarn $b2$ is fed to the needles, at the second feed, to interknit a free course of stitches $a2$ with the stitches of the first course $a1$. The course $a2$ locks the wire $w$ in place in the course $a1$ and in itself has no inlay of any kind. At the third feed, a body yarn $b3$ is fed to the needles to produce a course of stitches $a3$. Following the third feed, and while the stitches of the course formed at the third feed are still hanging on the needles, a rubber strand $r$ is laid-in in the fabric, under tension, in the same manner as the wire $w$ was laid-in in the course $a1$. At the fourth feed, a body yarn $b4$ is fed to the needles to produce another free course of stitches $a4$, by which the rubber strand $r$ is held in place in the fabric. A new course $a1$ is then knit to the course $a4$ at the first feed for a repeat of the cycle.

During the knitting of the tube A1, the belts 2 or any other equivalent mechanism, holds the tube to the normal knitted diameter against the tendency of the wire $w$ to twist and expand the tube radially.

As soon as the tube A1 is released from the holding device, i. e. the belts 2, 2, the wire $w$ immediately reacts to expand the diameter of the tube while the rubber strand $r$ reacts to contract the tube. As these opposing reactions occur at alternating intervals throughout the length of the tube, the wall of the tube is caused to assume a circumferentially corrugated form. The tube also twists circumferentially, in the manner above noted, whereby the wales assume a spiral form and lie at an angle to the axis of the tube.

Preferably the tube A1 is sprayed or otherwise coated or impregnated on its inner and/or outer surface while the tube is maintained at knitting diameter by the holding device. However, the coating or impregnation may take place subsequent to the releasing of the tube from the holding device.

In some instances, as for example in devices used with vacuum cleaner attachments, or with dictograph or speaking tube mouthpieces, an outer covering may be braided or otherwise formed around the outside of the tube, after the tube has been released and permitted to twist circumferentially.

The convolutions of the wire, in tending to expand at all times, prevents the tube from collapsing or deforming cross-sectionally when the tube is bent sharply in the direction of its length.

Due to the knitted wales extending at an angle to the axis of the tube instead of the wales running parallel to the axis of the tube, the tube can be bent longitudinally on an inside arc of very small radius. This condition is further accentuated with the structure shown in Figs. 9 and 10, due to the accordion effect produced in the tube by the circumferential corrugations; and the fact that the wales, in running spirally rather than parallel to the axis of the tube, place no restriction on the extensibility of the tube along the side of the bend having the arc of greatest radius.

Fig. 11 illustrates the rubber strand $r1$ as being of a flat ribbon-like cross-section and as being deformed therefrom into a substantially U shaped cross-section, due to the tension of the rubber and the bend of the stiches in which the rubber is incorporated. When the tube is cut cross-sectionally, into lengths for various uses, the rubber will be cut, releasing an end of the strand. The U shape of the rubber under tension, adjacent the cut, will immediately return to the normal flat ribbon-like cross-section and with the width of the ribbon being approximately the same as, or greater than, the walewise length of the stitches in which the ribbon is incorporated, the flattened end of the strand will anchor the cut end against substantial draw-back in the stitch course.

While the tubes of Figs. 2 and 10 have been described as being knit on "two feed" and "four feed" machines respectively, it will be clear to those familiar with the art of knitting that the tube may be knit on single feed machines, or machines of any desired number of feeds, with a wire incorporating attachment at each feed, or at any desired number of the feeds, to place the wire in each course, or in relatively spaced courses, as desired. For example, tubes of large diameters of three inches and upward, may be made on machines with six feeds or more.

Furthermore, in the case of the accordion tube of Figs. 9 and 10, it will be obvious that any desired number of free courses, corresponding to the courses $a2$ and $a4$ (Fig. 10), may be employed between the rubber-containing courses and the wire-containing courses.

It will be further understood that an inelastic filling strand composed of paper, or any other relatively inert textile yarn, may be incorporated in the free courses between the wire-containing courses of Fig. 2, or in the free courses of Fig. 10, or in the wire and/or rubber-containing courses together with the wire or the rubber, to reduce the size of the interstices when the tube twists under the reaction of the active convolutions of the wire.

While a metallic spring wire has been described in the foregoing description, and recited in the appended claims, it will be understood that the term is intended to cover any other material which would have the same general reactionary characteristics as the wire and by which the circumferential twisting, radial expansion, and non-collapsible features of the tube would be produced. For example, some forms of reed may be used in some instances for some purposes, or a tough resilient strand may be made by twisting paper and treating the strand with a synthetic resin to provide and retain resiliency in the strand. Other substitutes for the wire may be used to advantage in some instances, without departing from the spirit of the invention.

I claim:

1. A tubular structure comprising a seamless circular-knit tube composed of successively interknit stitch courses, and a resilient wire formed into active convolutions respectively incorporated in predetermined courses and constantly tending to twist the tube circumferentially about its axis.

2. A tubular structure comprising a seamless circular-knit tube composed of successively interknit stitch courses, and a resilient wire wound in one direction about the axis of the tube in radially expansible convolutions respectively incorporated in predetermined courses and constantly exerting a counter-directional twist on the tube tending to expand the tube radially.

3. A tubular structure comprising a seamless circular-knit tube composed of circumferentially extending stitch courses and stitch wales normally extending parallel to the axis of the tube, and a resilient wire wound in one direction about said axis in expansible convolutions respectively incorporated in predetermined stitch courses and constantly exerting a counter-directional twist on said tube tending to expand the tube radially and to cause the wales to assume an angular relation to the axis of the tube.

4. A tubular structure comprising a seamless circular-knit tube composed of circumferentially extending stitch courses and stitch wales normally extending parallel to the axis of the tube with open interstices of normal areas formed in the wall of the tube between said stitches and the component parts thereof, and a resilient wire formed in radially expansible convolutions respectively incorporated in predetermined courses and constantly tending to twist the tube circumferentially, expand the tube radially, and contract the tube longitudinally, to force the stitches of said wales and courses into compact relationship and thereby diminish the areas of said interstices.

5. A tubular structure comprising a seamless circular-knit tube composed of successively interknit stitch courses, a resilient wire formed into active convolutions respectively incorporated in relatively spaced courses and constantly tending to expand the tube radially with respect to its axis, and an elastic rubber strand formed into active convolutions respectively incorporated in intermediate courses and constantly tending to contract the tube radially with respect to its axis, said opposing tendencies maintaining the wall of the tube in a succession of circumferentially extending corrugations along the length of the tube.

6. A tubular structure comprising a seamless circular-knit tube composed of successively interknit stitch courses extending circumferentially of the tube and stitch wales normally extending parallel to the axis of the tube, a resilient wire wound in one direction about said axis into expansible convolutions respectively incorporated in spaced courses and constantly exerting a counter-directional twist and radial expansive influence on the tube at said spaced courses, and an elastic rubber strand formed into active convolutions respectively incorporated in courses intermediate those bearing said wire convolutions and constantly exerting a radially contracting influence on said tube at said intermediate courses, said opposing influences being alternately effective along the length of the tube and producing a succession of circumferential corrugations in the tube, with said wales extending spirally about the axis of the tube.

7. A tubular structure comprising a seamless circular-knit tube composed of successively interknit stitch courses extending circumferentially of the tube, a resilient wire wound into active convolutions respectively incorporated in spaced courses and constantly exerting a radially expanding influence on the tube at said spaced courses, and an elastic rubber strand formed into active convolutions respectively incorporated in courses intermediate those bearing said wire convolutions and constantly exerting a radially contracting influence on said tube at said intermediate courses, said opposing influences being alternately effective along the length of the tube and producing a succession of circumferential corrugations in the tube, said structure including at least one free stitch course between each wire-bearing course and each rubber strand-bearing course.

8. A tubular structure comprising a seamless circular-knit tube composed of successively interknit stitch courses extending circumferentially of the tube and stitch wales normally extending parallel to the axis of the tube, a resilient wire wound in one direction about said axis into expansible convolutions respectively incorporated in spaced courses and constantly exerting a counter-directional twist and radial expansive influence on the tube at said spaced courses, and an elastic rubber strand formed into active convolutions respectively incorporated in courses intermediate those bearing said wire convolutions and constantly exerting a radially contracting influence on said tube at said intermediate courses, said opposing influences being alternately effective along the length of the tube and producing a succession of circumferential corrugations in the tube, with said wales extending spirally about the axis of the tube, said structure including at least one free stitch course between each wire-bearing course and each rubber strand-bearing course.

9. A tubular circumferentially corrugated structure comprising a seamless circular-knit tube, radially active means constantly exerting an expanding influence on the tube at relatively spaced intervals along its length, and opposing radially active means constantly exerting a contracting influence on the tube intermediate said expansions to produce the corrugations.

10. The method of producing flexible tubing which consists in successively interknitting circular courses of stitches to form a seamless tube progressively, flexing a resilient wire into convolutions of a diameter substantially equal to the diameter of the tube being knit, and incorporating said convolutions under radial restriction in predetermined courses respectively during the progressive knitting of the tube to bind the wire in the tube with the wire constantly exerting a torsional strain on the tube under an inherent tendency of the wire to unwind from said convolutions.

11. The method of producing flexible tubing which consists in successively interknitting circular courses of stitches to form a seamless tube progressively, flexing a resilient wire into convolutions of a diameter substantially equal to the diameter of the tube being knit, incorporating said wire convolutions in relatively spaced courses under radial restriction to bind the wire in the tube with the wire constantly exerting a radially expanding force on the tube, incorporating a rubber strand in intermediate courses under tension to cause the rubber to constantly exert a radially contracting force on the tube in alternating relation to the expanding force of the wire along the length of the tube.

12. The method of producing flexible tubing which consists in successively interknitting circular courses of stitches to form a seamless tube progressively, flexing a resilient wire into convolutions of a diameter substantially equal to the diameter of the tube being knit, incorporating said wire convolutions in relatively spaced courses under radial restriction to bind the wire in the tube with the wire constantly exerting a radially expanding force on the tube, incorporating a rubber strand in intermediate courses under tension to cause the rubber to constantly exert a radially contracting force on the tube in alternating relation to the expanding force of the wire along the length of the tube, and knitting at least one free course between each wire-bearing course and each rubber-bearing course.

WALTER LARKIN.